United States Patent [19]

Jacobs

[11] Patent Number: 4,865,752
[45] Date of Patent: Sep. 12, 1989

[54] SEPARATION AND FILTRATION MEMBRANES AND THEIR REGENERATION

[76] Inventor: Albert L. Jacobs, 325 E. 41st St., New York, N.Y. 10017

[21] Appl. No.: 279,847

[22] Filed: Dec. 5, 1988

[51] Int. Cl.$^4$ .............................................. B01D 13/00
[52] U.S. Cl. ...................................... 210/791; 422/37
[58] Field of Search .................. 252/106; 424/80, 150; 210/791, 797, 798; 422/1, 26, 27, 28, 29, 31, 37

[56] References Cited

U.S. PATENT DOCUMENTS 4,113,857  9/1978  Shetty ................................. 252/106

*Primary Examiner*—Frank Sever
*Attorney, Agent, or Firm*—Jacobs & Jacobs

[57] ABSTRACT

A composition and method of cleansing and regenerating contaminated filtration membranes is described together with the synergized antimicrobial aqueous solution of an inorganic peroxide and a polymeric solubilized iodine complex. The membrane to be regenerated is of the type used in ultrafiltration, reverse osmosis and microfiltration and the construction and composition of the member is per se known.

2 Claims, No Drawings

SEPARATION AND FILTRATION MEMBRANES AND THEIR REGENERATION

THE PRESENT INVENTION

This invention relates to soiled, clogged or contaminated separation and filtration membranes such as those used in ultrafiltration, reverse osmosis and microfiltration equipment wherein the membranes after a given period of time and use require cleaning or regeneration to restore their porosity and efficiency and the present invention relates to the cleaning and restoration of such contaminated and clogged membranes.

BACKGROUND OF THE INVENTION

Membranes of various types and compositions are known for use in ultrafiltration, reverse osmosis and microfiltration and are conventionally made of polymers having a structure which rejects solutes at the surface. Such membranes may be made of cellulose acetate films and polysulfones. A typical ultrafiltration process is described in U.S. Pat. No. 3,758,405 wherein the membranes are composed of cellulose acetate films which can be cleansed as described in the patent. It is also known to use ultrafiltration for removing contaminants and impurities from the water supply to boilers and other types of heating apparatus whose operation becomes progressively ineffective by the undesirable impurities and contaminants collecting or deposited thereon during use which reduce the efficiency of the filtration equipment. Generally membranes of the type hereinabove referred to are taken out of service individually without discontinuing the operation of the entire equipment and hence a plurality of membranes is provided which are spaced apart and individually mounted so that a single membrane may be removed without adversely effecting the function and operation of the remaining membranes. Various procedures have been proposed for restoring the cleanliness and efficiency of filtration membranes by the use of hydrogen peroxide in aqueous solution at a temperature ranging from about 10° C. to about 75° C. i.e. under ambient conditions but below the boiling point of water which is 100° C. Depending on the source of feed water or other liquid (influent) passing through the membranes a variety of types of contaminants gradually accumulate and prevent passage of influent through the membranes by contaminants in the influent including slime and bacterial coating which accumulates thereon. As far as is known no rapid and effective and inexpensive cleaning or regenerating operation of known types of membranes and the removal of contaminants or clogging or coating matter has been carried out in a manner to render them clean and sterile ready for re-use with particular respect to the removal of accretions and coatings of microorganisms and bacterial slime and the present invention is directed to that objective.

DETAILS OF THE PRESENT INVENTION

This invention relates to the cleaning and regeneration of membranes used in ultrafiltration, reverse osmosis and microfiltration equipment wherein there are a plurality of such membranes mounted in relatively close juxtaposition and the membranes are so mounted in the usual equipment that they are individually removable and replaceable. Membranes of the types referred to gradually and progressively become clogged or contaminated with undesirable materials from the influent(s) which adversely effect the ability of the membranes to remove accumulated particles from the influent(s) and especially slime, microbial and microbial accretion. As the membranes continue in use they become clogged or fouled and covered or coated with slime either individually or as a group and in accordance with the present invention the membranes are cleansed or restored to full efficiency by first subjecting them to flushing or washing with clean or pure water and subjecting them to the action of an antimicrobial solution or composition comprising an aqueous oxidizing solution of hydrogen peroxide with which has been admixed an antimicrobial agent such an aqueous solution of povidone iodine complex. An interaction or synergistic-like effect takes place between the hydrogen peroxide solution and the povidone iodine solution which is especially efficacious in inhibiting or destroying microbial accretions and slime which adversely affect the porosity and efficacy of the membranes. Thus in accordance with the present invention an individual contaminated or slime coated membrane is removed from an assemblage of membranes, is washed with a gentle stream of sterile or purified water and is then dipped into a container having therein an admixture of the aqueous solution of $H_2O_2$ and PVPI. The contaminated membrane may alternatively be sprayed or swabbed or brushed with the antimicrobial solution, or immersed in the antimicrobial solution for a short—1-6 seconds—period of time. Depending upon the extent of contamination the membrane may be subjected more than once to the enhanced antimicrobial solution and in the case of badly clogged, slimed or contaminated membranes the antimicrobial solution may be passed therethrough in a forward and then in a reverse direction or vice versa. This latter is the preferred and best known mode of carrying out the invention when slime or slimy contamination or coating is involved and the treatment rapidly converts the membrane to its original pristine condition prior to re-insertion into the filtration equipment and in the case of boilers which are particularly subject to microbial contamination and encrustation the enhanced antimicrobial solution causes the microbial accretions and encrustations to dissolve or become dislodged and flow or pass through or out of the equipment leaving the surface clean when treated with a stream or spray or by immersion in a vat or tank of the cleaning composition.

Various types of known membranes are susceptible to regeneration by means of the present invention and by using an aqueous admixture of $H_2O_2$ and PVPI, preferably freshly prepared, the conventional and more time consuming and less effective cleaning or anti-fouling procedures are improved and the regeneration of the membrane is accomplished in a single step in one direction or a double step which may be a reverse cleaning step. This presents advantage and economies over prior known treatments of contaminated membranes by one or more cleaning or washing steps and since both the $H_2O_2$ and the PVPI are freely water soluble and commercially available the membrane can be treated and then washed with sterile or purified water and optionally thereafter dried in a current of warm air. The used antimicrobial solution is disposed of in any desirable manner and can act to sterilize the effluent of the equipment.

The concentration of $H_2O_2$ and PVPI solution is not critical but is preferably about 1–5% $H_2O_2$ and about 5-10% PVPI and in most instances only a very small amount is required as the solution acts virtually instantaneously. While the use of hydrogen peroxide is the best and most effective inorganic peroxide for the present invention it is understood that other aqueous oxidizing solutions can be employed which do not permanently discolor, coat or chemically attack the membrane itself. Examples of other oxidants which may be used include one or more of the alkali metal iodates such as potassium, sodium, ammonium and/or lithium iodate which is/are water soluble but $H_2O_2$ is preferred and best since it leaves no film or deposit on the frame of the membrane. When an iodate is used, the washing step after cleaning of the membrane removes any residue.

The present invention is not limited to the nature or composition of the membrane or its frame, manner of assemblage, equipment or method of use and within the purview of the present invention ultrafiltration, reverse osmosis and microfiltration membranes of known commercial grades and qualities may be employed such as those described in U.S. Pat. No. 4,740,308, the relevant membranes portions of which are hereby made a part hereof, especially those of polymeric nature which are of sufficient strength to withstand continued use over a considerable period of time without necessarily requiring frequent regeneration. This factor depends largely on the influent to the equipment and the type and nature of the contaminants in the influent and is particularly applicable to the accumulation of slime from the influent which can be ocean or brackish water or waste water from nearby equipment and plants.

The equipment employing the membranes is not per se a part of the present invention since there are many different types of filtration equipment known and available for a wide variety of purposes and the present invention is deemed to be applicable thereto. The invention may be subject to modification and change within the scope of the subjoined claims.

What is claimed:

1. A process of treating clogged, slime coated or otherwise contaminated microporous filtration membranes, comprising: providing a contaminated membrane having pores of which are prevented by contaminants, slime or clogging matter from permitting the desired passage of liquid to be filtered, washing the contaminated membrane with sterile water in a forward and/or reverse direction or both, immersing the thus washed membrane in or with an antimicrobially enhanced aqueous solution of $H_2O_2$ and PVPI of a concentration sufficient for removing said contaminants, slime or clogging matter from said membrane, and thereafter removing any undesired residue by washing with sterile water optionally followed by drying in a stream of warm air.

2. A method according to claim 1 wherein a membrane is physically removed from an assemblage of membranes mounted in close juxtaposition in filtration equipment, subjecting the membrane to the treatment described in claim 1 and replacing the removed membrane in the assemblage of membranes.

* * * * *